United States Patent Office 3,591,564
Patented July 6, 1971

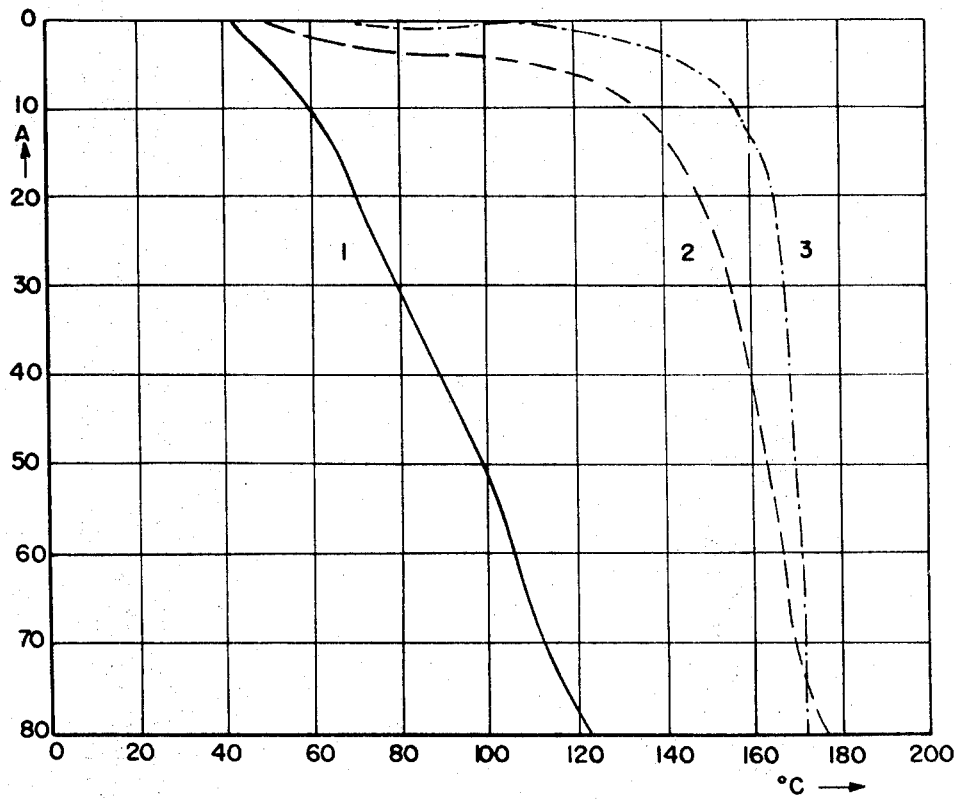
INVENTORS:
PAUL RAFF
LUDWIG SCHUSTER
GUENTER BECHT
HELMUT DOERFEL

3,591,564
TRANSPARENT POLYAMIDES FROM TETRAHY-
DROTRICYCLOPENTADIENYLENE DIAMINES
Paul Raff and Ludwig Schuster, Ludwigshafen (Rhine),
Guenter Becht, Speyer (Rhine), and Helmut Doerfel,
Ludwigshafen (Rhine), Germany, assignors to Badische
Anilin- & Soda-Fabrik Aktiengesellschaft, Ludwigs-
hafen (Rhine), Germany
Original application Oct. 26, 1965, Ser. No. 505,291, now
Patent No. 3,505,402, dated Apr. 7, 1970. Divided
and this application Apr. 3, 1968, Ser. No. 738,739
Claims priority, application Germany, Oct. 29, 1964,
B 79,115; Mar. 27, 1965, P 15 70 246.2
Int. Cl. C08g 20/20
U.S. Cl. 260—78                                    3 Claims

ABSTRACT OF THE DISCLOSURE

Production of transparent polyamides of tetrahydrotri-
cyclopentadienylene diamines having the formula:

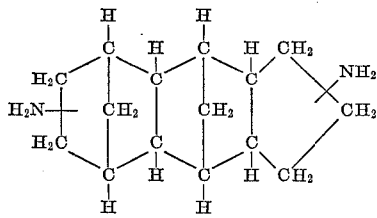

wherein said diamines are polycondensed with dicar-
boxylic acids, dicarboxylic esters or dicarboxylic chlo-
rides at elevated temperature, and new polyamides con-
taining said diamines.

RELATED APPLICATION

This application is a division of our application Ser.
No. 505,291, filed Oct. 26, 1965, now U.S. Pat. No.
3,505,402, issued Apr. 7, 1970.

INTRODUCTION

It is known that transparent polyamides may be pro-
duced by polycondensing salts of the diamine/dicarboxylic
acid type at elevated temperature and if desired at super-
atmospheric pressure. In this method, for example ali-
phatic diamines having branched carbon chains, such as
trimethylhexamethylene diamine, cyclohexane derivatives,
such as 3-aminomethyl-(3,5,5-trimethyl - 1 - cyclohexyl-
amine), or diamines which are derived from fluorene, such
as 9,9-bis-(3'-aminopropyl)-fluorene, are used as the di-
amines. Some of these polyamides are difficultly accessi-
ble, some have a relatively low softening point and some
are readily attacked by organic solvents.

It is also known that transparent polyamides may be
produced by polycondensing mixtures of several poly-
amide-forming starting materials, e.g. a mixture of capro-
lactam, 4,4'-diaminodicyclohexylmethane/adipic acid and
hexamethylenediamine/adipic acid, or by mixing homo-
condensates with transparent copolyamides. Such poly-
amides usually have a lower softening point than homo-
polyamides; moreover, they are not resistant to organic
solvents, have considerably cold flow and form spherulites
on heating with the result that they become turbid.

DESCRIPTION OF THE INVENTION

This invention relates to an improved process for the
production of transparent polyamides by polycondensa-
tion of a mixture of tetrahydrotricyclopentadienylene
diamines having the formula above with dicarboxylic
acids, dicarboxylic esters or dicarboxylic chlorides at ele-
vated temperatures and to polyamides containing said
diamines.

It is the object of the invention to provide new com-
pletely transparent polyamides and a method for produc-
ing them. These and other objects and advantages will be
better understood from the following detailed description.

As described in the aforesaid U.S. Pat. No. 3,505,402
tetrahydrotricyclopentadienylene diamines having the for-
mula:

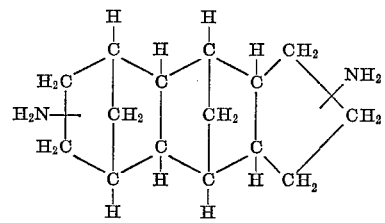

(hereinafter referred to as tetrahydrotricyclopentadienyl-
ene diamine mixture) are surprisingly obtained in much
higher yields by reaction of tricyclopentadiene with hy-
drogen cyanide in the presence of sulfuric acid at a
temperature of from $-5°$ to $+35°$ C., preferably from
$0°$ to $30°$ C., and hydrolysis of the tetrahydrotricyclo-
pentadienylene diformyl diamine mixture thus obtained,
by using the hydrogen cyanide in at least four times, pref-
erably six to sixteen times, the molar amount with refer-
ence to tricyclopentadiene and the sulfuric acid in three
to six times, preferably four times, the molar amount with
reference to tricyclopentadiene.

The reaction may be represented by the following for-
mulae:

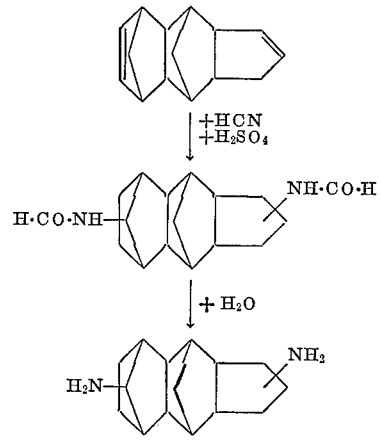

The positions of the formylamino and amino groups
are assumed to be statistically distributed over the four
possibilities.

By polycondensation of the mixtures of tetrahydrotri-
cyclopentadienylene diamines having the molecular for-
mula $C_{15}H_{24}N_2$, with dicarboxylic acids or their esters or
chlorides at elevated temperature, if desired at superat-
mospheric pressure, there are obtained completely trans-
parent polyamides having a high softening point.

In contrast to known transparent polyamides the new
polyamides according to this invention have the advan-
tage that they contain a readily accessible diamine and
have a high softening point. Even thick-walled articles
made of the novel polyamides are completely transparent.
Homopolyamides in particular have high softening points
and do not lose their transparency when tempered for a
long period at temperatures close to their softening points.
When boiled in water the polyamides lose none of their
transparency. The polyamides manufactured according to
this invention have unusually high glass temperatures so
that at elevated temperature they are stiffer than partly crystalline polyamides whose glass temperatures are usually below 50° C.

Aliphatic dicarboxylic acids, particularly alkanedicarboxylic acids having 5 to 18 carbon atoms, such as adipic acid, suberic acid, sebacic acid, decanedicarboxylic acid, heptadecanedicarboxylic acid or mixtures of these acids are prefered as dicarboxylic acids. Araliphatic dicarboxylic acids, such as p-phenylene-bis-(3,3'-isovaleric acid), and cycloaliphatic dicarboxylic acids, such as cyclohexanedicarboxylic acid and cyclooctanedicarboxylic acid, are also suitable; aromatic dicarboxylic acids are advantageously used in admixture with other acids, particularly with aliphatic dicarboxylic acids, for the manufacture of polyamides containing tetrahydrotricyclopentadienylene diamines.

The mixture of tetrahydrotricyclopentadienylene diamines may also be used as a polyamide-forming component in the manufacture of copolyamides; in this case, there may be employed as starting materials for example a mixture of tetrahydrotricyclopentadienylene diamine with other diamines commonly used in polyamide production instead of tetrahydrotricyclopentadienylene diamine alone, or a mixture of dicarboxylic acids, or a mixture of dicarboxylic acids with lactams having preferably 7 to 12 ring members or with aminocarboxylic acids.

Conventional polycondensation methods are suitable for the production of the new polyamides. The polyamides may be obtained for example by heating about equimolar amounts of the salts of the tetrahydrotricyclopentadienylene diamine mixture and the dicarboxylic acids at superatmospheric pressure in the absence of oxygen, water being removed at least in the last phase of the polycondensation. To accelerate water removal inert gases, such as nitrogen, may be passed through or over the polycondensation mixture or the polycondensation may be carried out at subatmospheric pressure. The new polyamides may also be produced by interfacial polycondensation or by solution polycondensation. In the case of interfacial polycondensation the tetrahydrotricyclopentadienylene diamine mixture is reacted with acid chlorides in conventional manner in a two-phase mixture of water and for example aromatic hydrocarbons, such as toluene.

Polycondensation may be carried out in the presence of conventional additives, such as chain terminators, e.g. carboxylic acids or their derivatives or amines, heat or light stabilizers, melt-viscosity stabilizers, optical brighteners, fillers or lubricants.

The new completely transparent polyamides may be readily shaped and are suitable for example for the manufacture of molded articles, such as sheets, tubes, rods, bristles, filaments or injection-molded articles.

The invention is further illustrated by the following examples. The parts and percentages specified in the examples are by weight.

EXAMPLE 1

A mixture of 1067 parts of 90% sulfuric acid and 780 parts of anhydrous hydrocyanic acid is placed in a vessel having a high-speed stirrer. With intense stirring, 495 parts of molten tricyclopentadiene is sprayed through nozzles having a bore of 0.5 mm. diameter into the mixture of hydrocyanic acid and sulfuric acid, the temperature being kept at 0° to 3° C. by external cooling. A clear brown solution is formed which is stirred for another four hours at 25° to 30° C. The reaction mixture is then diluted with 2500 parts of water and the excess hydrocyanic acid is distilled off completely over a column. The solution remaining behind is boiled under reflux for another half an hour. The clear brown solution is then cooled and 50% caustic soda solution is added at 30° C. while stirring until an alkaline reaction has been set up. The solution is then extracted three times, each time with 300 parts of cyclooctylamine, 500 parts of benzene is added to the combined extracts and then washed with 1000 parts of water. Benzene and water are first distilled off azeotropically from the solution. The residue is fractionated first at a pressure of about 10 to 25 mm. Hg, removing the bulk of the amine used as extraction agent. Distillation is then continued at a lower pressure, for example at 0.1 mm. Hg. 454 parts of tetrahydrotricyclopentadienylene diamine mixture having a boiling point of about 125° C. at 0.1 mm. Hg or 216° to 218° C. at 18 mm. Hg is obtained; this is equivalent to a yield of 78.5% based on tricyclopentadiene. The amine number is 475 (calculated value 483).

EXAMPLE 2

A mixture of 1091 parts of 88% sulfuric acid and 812 parts of anhydrous hydrocyanic acid is placed in a vessel having a high-speed stirrer. 495 parts of tricyclopentadiene is added with intense stirring, as in Example 1, the temperature being kept at 0° C. Following an after reaction period of one hour at 0° C., 245 parts of hydrogen cyanide is distilled off at 0° C. in the course of two and a half hours by means of a stream of carrier gas. The temperature is then raised to 30° C. After a further after reaction period of three and a half hours at this temperature, the mixture is worked up as described in Example 1. 523 parts of tetrahydrotricyclopentadienylene diamine mixture is obtained. This is equivalent to a yield of 90.5% with reference to tricyclopentadiene. The amine number is 447 (calculated value 483).

In the following examples the preparation of the polyamides is described:

EXAMPLE 3

A mixture of 53.58 parts of tetrahydrotricyclopentadienylene diamine, 46.42 parts of sebacic acid and 25 parts of water is placed in an autoclave, the latter is flushed with nitrogen three times and the mixture is heated at 230° C. for two hours at autogenous pressure. The pressure in the autoclave is then released; the polycondensation mixture is simultaneously heated to 270° C. and maintained at this temperature for six hours. Wire produced from the polycondensate in conventional manner is tough and completely transparent. The polyamide has a K-value of 55 (1% in concentrated sulfuric acid) and a flow temperature of 230° C.

The fact that the polyamide has great stiffness even at elevated temperature is proved by measuring its softening behavior. For this purpose a specimen sheet having the dimensions 30 mm. x 10 mm. x 2 mm. is prepared and clamped at one of its narrow ends between two jaws to a depth of 5 mm. At the opposite narrow end of the sheet, at a distance of 5 mm. from the edge, a support is fastened to the sheet at right angles thereto which carries a weight of 80 g. at a height of 77 mm. The sheet is immersed in a well-stirred, heatable glycerol bath whose temperature is raised by 5° C. in the course of two minutes. The support for the weight is provided with a pointer which indicates the angle of deflection of the polyamide sheet on a dial. In the case of commercial polyamides this angle of deflection generally begins to increase to 3 to 5° at a temperature very closely above the room temperature of 0° C. The angle of deflection is measured up to 80° C. in dependence on time. In the accompanying drawing the angles of deflection A of various polyamides are plotted against temperature as a measure of the softening behavior. Curve 1 shows the softening behavior of a commercial polycaprolactam (nylon 6) having a K-value of 73, curve 2 that of a corresponding polyamide derived from adipic acid and hexamethylenediamine (nylon 6,6) having a K-value of 72, and curve 3 that of the polyamide prepared according to Example 3 from tetrahydrotricyclopentadienylene diamine and sebacic acid and having a K-value of 55. From a comparison of the curves it may be seen that the polyamide prepared from tetrahydrotricyclopentadienylene diamine and sebacic acid and having a flow temperature of 230° C. has much higher flexural strength than nylon 6 (flow temperature about 220°

C.) and is slightly superior with respect to this property even to nylon 6,6 whose flow temperature at 255° C. is considerably higher than that of the polyamide according to this invention.

The polyamide manufactured according to this invention remains completely transparent even when it is boiled in water for several hours or when its melt is allowed to cool slowly (e.g. in the course of 24 hours). Maximum water absorption is about 5% (hence great dimensional stability). In contrast to polycaprolactam, the polymer does not contain any monomers or low molecular weight substances which are extractable with water so that after the wire cooled in a waterbath has been granulated and dried for a short period it can be immediately processed in conventional manner by injection molding or extrusion.

EXAMPLE 4

A mixture of 50.35 parts of tetrahydrotricyclopentadienylene diamine mixture, 41.65 parts of decanedicarboxylic acid and 25 parts of water is polycondensed in an autoclave under the conditions described in Example 3. The polyamide thus obtained is tough and completely transparent. Its transparency is not affected by boiling in water or by slow cooling of a melt of the polymer. The polyamide has a K-value of 53 and a flow temperature of 220° C. Maximum water absorption is about 4%.

EXAMPLE 5

45 parts of caprolactam, 52.5 parts of a salt of adipic acid and hexamethylenediamine, 32.22 parts of tetrahydrotricyclipentadienylene diamine mixture and 20.16 parts of adipic acid are mixed with 37.5 parts of water in an autoclave and polycondensed under the conditions described in Example 3. A tough and completely transparent polycondensate having a K-value of 71 and a flow temperature of 156° C. is obtained. By heating the polyamide in methanol a stable 20% solution is obtained from which very tough films may be cast.

EXAMPLE 6

300 parts of water, 1.74 parts of potassium hydroxide and 3.50 parts of tetrahydrotricyclopentadienylene diamine mixture are mixed in an intensive mixer at room temperature. A solution of 3.59 parts of sebacyl chloride in 200 parts of methylene chloride is added to the stirred diamine solution. The reaction product is separated from the mixture, washed until neutral with water and dried. 4.8 parts of a white powder having a K-value of 40 (1% in concentrated sulfuric acid) is obtained.

We claim:
1. A polyamide having a high softening point and consisting essentially of a polycondensation product of (a) a tetrahydrotricyclopentadienylene diamine mixture having the formula

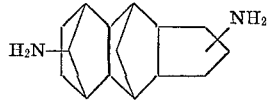

and (b) an alkane dicarboxylic acid of 5 to 18 carbon atoms, an ester thereof, or an acid chloride thereof.

2. A polyamide as claimed in claim 1, wherein said component (b) is an alkane dicarboxylic acid having 5 to 18 carbon atoms.

3. A polyamide having a high softening point and consisting essentially of (a) a polycondensation product of a tetrahydrotricyclopentadienylene diamine mixture having the formula

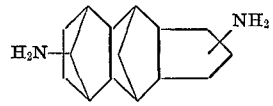

(b) hexamethylene diamine, and (c) an alkane dicarboxylic acid of 5 to 18 carbon atoms, an ester thereof, or an acid chloride thereof.

References Cited

UNITED STATES PATENTS 3,069,468  12/1962  Cox et al. _____ 260—78
3,301,827  1/1967   Martin _____ 260—78

HAROLD D. ANDERSON, Primary Examiner

U.S. Cl. X.R.

260—30.8, 33.4